United States Patent [19]

Araki

[11] Patent Number: 4,671,710
[45] Date of Patent: Jun. 9, 1987

[54] DRILL BIT

[75] Inventor: Masatada Araki, Handa, Japan

[73] Assignee: Nippon Oil & Fats Co., Ltd., Tokyo, Japan

[21] Appl. No.: 546,461

[22] Filed: Oct. 28, 1983

[51] Int. Cl.$^4$ ............................................. B23C 51/02
[52] U.S. Cl. ................................. 408/145; 408/211; 408/230
[58] Field of Search ............... 408/205, 230, 229, 211, 408/144, 145; 407/118, 119; 76/101 A, 101 B, 108 T, DIG. 12

[56] References Cited

U.S. PATENT DOCUMENTS

| 10,744 | 4/1854 | Pease | 408/211 |
| 2,334,089 | 11/1943 | Hallden | 408/211 |
| 2,898,786 | 8/1959 | Willingham | 408/211 |
| 3,028,773 | 4/1962 | Borneman | 408/211 |
| 4,143,723 | 3/1979 | Schmotzer | 408/230 X |
| 4,373,839 | 2/1983 | Negishi et al. | 408/205 X |
| 4,440,532 | 4/1984 | D'Apuzzo | 408/229 |

FOREIGN PATENT DOCUMENTS

| 1123205 | 5/1982 | Canada | 408/145 |
| 2085769 | 5/1982 | United Kingdom | 408/144 |

Primary Examiner—Z. R. Bilinsky
Attorney, Agent, or Firm—Oblon, Fisher, Spivak, McClelland & Maier

[57] ABSTRACT

A drill bit the point of which has two or more outer cutting edges and is formed with a V-shaped notch. The V-shaped notch has its center lying on the axis of rotation of the drill bit and opens in the direction of feed of the tool. The V-shaped notch defines inner cutting edges terminating in respective outer cutting edges.

16 Claims, 17 Drawing Figures

DRILL BIT

BACKGROUND OF THE INVENTION

1. Field of the Invention

This invention relates to drill bits.

2. Description of the Prior Art

In an ordinary drill, there is a chisel provided in the neighborhood of the axis of rotation. While the chisel is a peculiar feature of a drill or the like, it is also a drawback, that is, it gives rise to high thrust load and torque load. Particularly, high thrust load often causes breakage of the drill or cause damage to the cutting edge, and various methods have been contrived to solve this problem. More specifically, the prior art solid type drill has cutting edges and flanks formed at the tip portion and has margins on the body, and it also has a chisel edge formed at dead center. When a workpiece is drilled using this drill, the cutting edges are fed in while cutting the workpiece. At this time, the chisel edge is forced into workpiece rather than entering the workpiece by cutting and experiences excessive thrust load. Therefore, it suffers pronounced wear or damage, which curtails its service life, and is prone to breakage.

Another drawback of the chisel edge is that the very high resistance offered to it causes "grinding motion" of the drill with its opposite ends alternately constituting an axis of rotation in the initial stage of drilling operation. The "grinding motion" leads to "vibration", and once this occurs, the workpiece can no longer be cut and the tool is broken.

In order to solve the above problems, a drill having a thinned chisel, i.e., a drill with a reduced length of chisel edge, has been proposed. However, reducing the width of the chisel reduces its mechanical strength. Besides, the thinned portion is subject to greater wear.

To solve all the problems due to the presence of the chisel, there has been proposed a drill which is free from any chisel, more particularly free from any cutting edge in a zone where there is a chisel in the usual drill (as disclosed in Japanese Patent Application Public Disclosure No. Sho 56(1981)-52110). In this drill, a gap or cavity is formed at the center of the point, and material of the work that remains in a cylindrical form in the gap while the workpiece is being drilled is twisted apart by cutting resistance. By virtue of the freedom from a chisel of this drill, it is possible to alleviate the thrust load and suppress grinding motion. However, material of the work in the neighborhood of the axis of rotation of the tool is not cut out but plucked out by shearing force. This is undesired from the standpoint of machining operation.

SUMMARY OF THE INVENTION:

One object of the invention is to provide a drill bit which can reduce thrust load, has extended life, and can perform efficient drilling operation.

To attain the above object, there is provided a drill bit the tip portion of which has two or more outer cutting edges and also has two inner cutting edges defined by a V-shaped notch having a center lying on the axis of rotation of the drill bit, the opening of the V-shaped notch being directed in the direction of feed of the drill bit, the two inner cutting edges defined by the V-shaped notch terminating in the aforementioned two or more outer cutting edges.

According to the invention, the V-shaped notch is provided in the chisel edge at the leading end of the drill instead of elimination of the pointed chisel in the prior art drill such that it defines cutting edges, so that it is possible to reduce thrust load so as to reduce wear and damage and obtain efficient drilling operation.

The above and further objects, features and advantages of the invention will become more apparent from the description of the preferred embodiments when the same is read with reference to the accompanying drawings.

DESCRIPTION OF THE PREFERRED EMBODIMENTS

Figure 1:
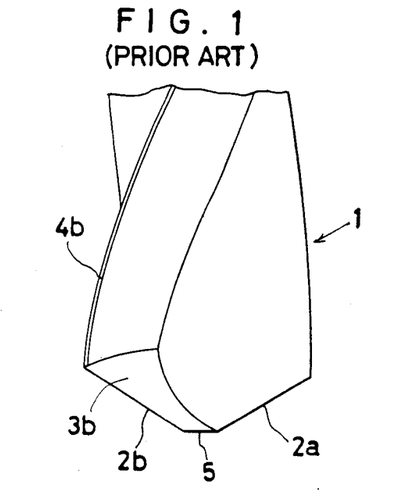
FIG. 1 is a side view showing the leading end portion of a prior art drill.
Figure 2:
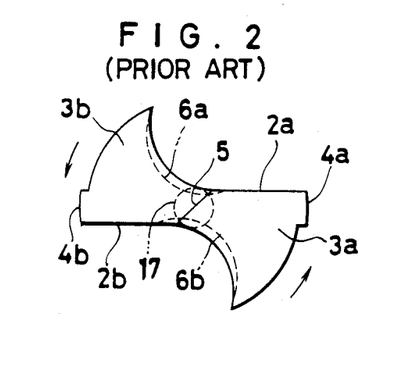
FIG. 2 is a plan view of the drill shown in FIG. 1.

FIGS. 1 and 2 show a prior art solid type drill. This drill 1 has cutting edges 2a, 2b and flanks 3a, 3b at the tip portion and margins 4a, 4b on the body, and also has a chisel edge 5 at dead center. When drilling is done using this drill 1, the cutting edges 2a, 2b are fed in while cutting out the workpiece. The chisel edge 5, however, is forced into the workpiece and experiences excessive thrust load, thus curtailing the service life of the drill or causing breakage thereof.

In addition, because of the presence of the chisel edge 5 the cutting resistance is very high, and "grinding motion" of the drill with the opposite ends of the chisel edge alternately constituting an axis of rotation is caused in the initial stage of drilling operation.

In order to overcome the above drawbacks, a drill having a reduced chisel as shown by dashed lines 6a, 6b in FIG. 2 has been proposed. Reducing the width of the chisel as in this drill, however, reduces the mechanical strength of the chisel.

Figure 3:
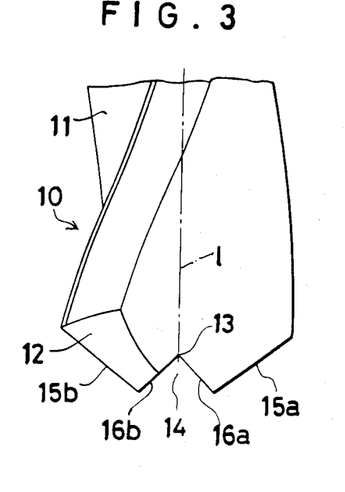
FIG. 3 is a side view showing the leading end portion of a first embodiment of the drill according to the invention.
Figure 4:
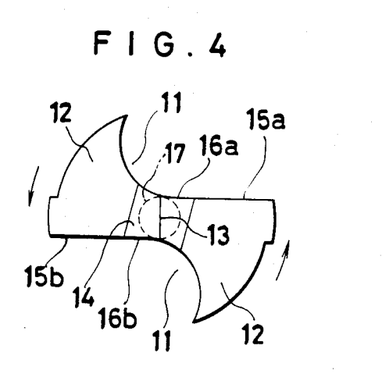
FIG. 4 is a plan view of the drill of FIG. 3.

FIGS. 3 and 4 show the basic structure of the leading end portion of a drill as a first embodiment of the invention. The drill 10 has spiral flutes 11 of substantially U-shaped sectional profile formed in the body and extending from the neighborhood of the shank to the point portion. The point portion is substantially conical and has a V-shaped notch 14 formed at the center. Bottom edge 13 of the V-shaped notch 14 is located on the axis of rotation. The opening of the notch 14 is directed in the direction of feed. Front edges 15a, 15b of the conical surfaces 12 intersecting with the flutes 11 in the direction of rotation of the drill 10 serve as outer cutting edges. Front edges 16a, 16b of the surfaces of the V-shaped notch 14 intersecting with the flutes 11 in the direction of rotation of the drill 10 serve as inner cutting edges. The outer and inner cutting edges 15a and 16a meet each other, and the outer and inner cutting edges 15b and 16b meet each other. A circular non-cutting zone 17 with a diameter corresponding to the bottom edge 13 is formed, in which no material is cut by any cutting edge.

In the prior art drill 1 the pointed chisel that corresponds to the non-cutting zone 17 according to the invention is forced into the material of the work which is not cut. According to the invention, the material of the work that is not cut is forced against the bottom of the notch, and as the drill is fed in it is separated and forced out from the opposite sides of the notch to be carried out along with material removed by the outer cutting edges 15a, 15b.

Comparing the processing of workpiece in the non-cutting zone of the prior art drill shown in FIGS. 1 and 2 and the processing of workpiece in the non-cutting zone of the drill according to the invention, in the former case the material of the work must be forcibly spread into the zone where material is normally cut by cutting edges, whereas in the latter case the material need be only collected to the bottom of the notch in the non-cutting zone and forced out from the opposite sides of the notch. Thus, the deformation resistance is much lower in the latter case than in the former case, provided the area of the non-cutting zone is the same.

Figure 5:
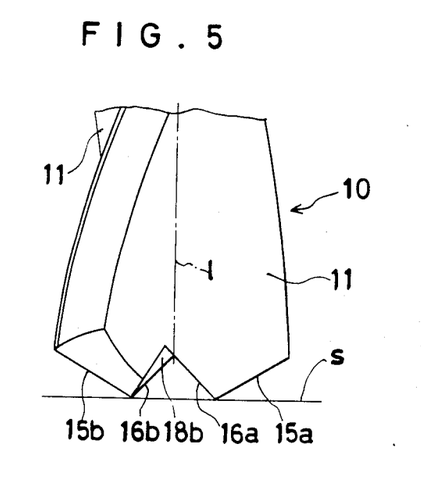
FIG. 5 is a side view showing the leading end portion of a second embodiment of the drill according to the invention.
Figure 6:
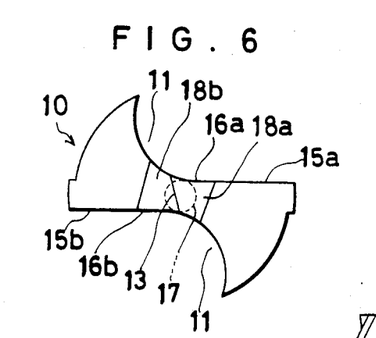
FIG. 6 is a plan view of the drill of FIG. 5.
Figure 7:
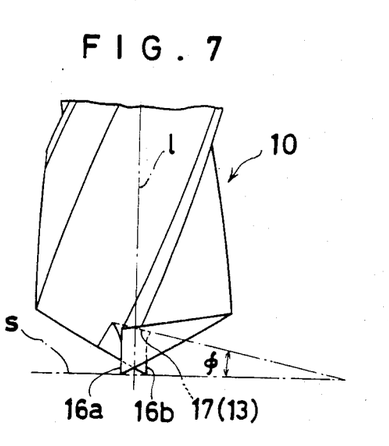
FIG. 7 is a view showing the drill of FIG. 5 in a direction at an angle of 90° with respect to FIG. 5.

FIGS. 5, 6 and 7 show a second embodiment of the drill 10 according to the invention. In this instance, the bottom edge 13 of the V-shaped notch 14 has an angle $\phi$ to the plane S normal to the axis 1 of rotation of the drill 10. This is obtained by providing a difference between the angles of flanks 18a, 18b of the inner cutting edges 16a, 16b. The angle of the bottom edge 13 of the V-shaped notch 14 is clearly shown in FIG. 7, which is a view taken from the right side of the drill 10 shown in FIG. 5. With this structure, the thrust load exerted in the drilling operation gives rise to a component tending to force the work material out of the bottom 13 of the V-shaped notch 14 in the non-cutting zone 17 while urging the work material against the bottom 13. This has the effect of improving the removal of the work material in the non-cutting zone 17 and reducing the thrust load.

Due to the difference between the setting angles of the flanks 18a, 18b as shown in FIG. 6, the bottom 13 of the V-shaped notch falls outside the non-cutting zone 17. By making the setting angles of the flanks 18a, 18b equal to each other, however, the bottom 13 can be allowed to fall within the non-cutting zone 17 while being inclined relative to the horizontal plane S.

Figure 8:
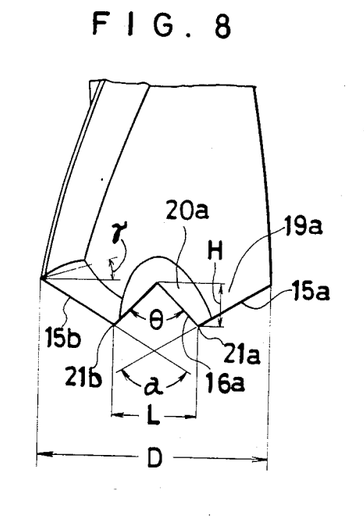
FIG. 8 is a side view showing the leading end portion of a third embodiment of the drill according to the invention.
Figure 9:
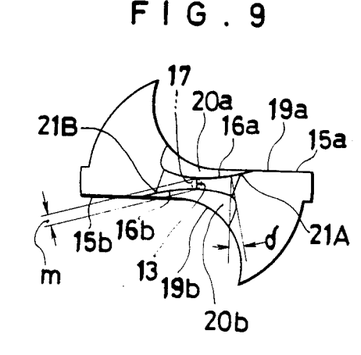
FIG. 9 is a plan view of the drill of FIG. 8.

FIGS. 8 and 9 show a third embodiment of the drill 10 according to the invention. This drill has a thinned portion like the thinned chisel of the prior art drill. More specifically, flute surfaces 19a, 19b of the drill body are formed with recessed surfaces 20a, 20b in the neighborhood of the axis of rotation of the drill. The length of the bottom edge 13 of the V-shaped notch 14, and hence of the non-cutting zone 17, is thus reduced. With this structure, the amount of work material that is removed without being cut is reduced, so that the thrust load can be further reduced. In the prior art drill, by reducing the width of the chisel the mechanical strength thereof is reduced to promote wear of the cutting edges as mentioned earlier. The drill according to the invention is free from this problem because it has no chisel and experiences low thrust load.

When a hard workpiece is to be drilled, however, a sharply pointed portion of a cutting tool, e.g., the portions 21A and 21B in the drill of FIGS. 8 and 9, is liable to be worn out or broken due to stress concentration irrespective of whether there is a thinned portion or not.

Figure 10:
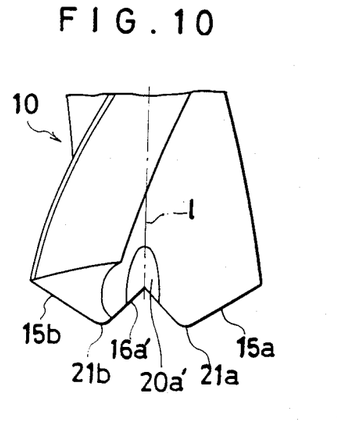
FIG. 10 is a side view showing the leading end portion of a fourth embodiment of the drill according to the invention.
Figure 11:
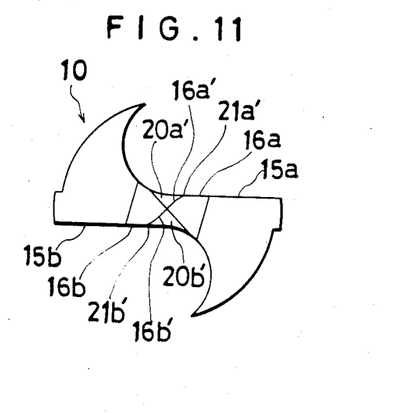
FIG. 11 is a plan view showing a fifth embodiment of the drill according to the invention.

FIGS. 10 and 11 show drills according to the invention, which are free from sharply pointed portions to overcome the drawback in the cutting tool noted above. More particularly, FIG. 10 shows a fourth embodiment of the drill 10, in which the surfaces of the V-shaped notch terminate in points smoothly via curved surfaces 21a, 21b, and FIG. 11 shows a fifth embodiment of the drill 10, in which recessed surfaces 20a', 20b' terminate in non-recessed surfaces via curved surfaces 21a', 21b'. In addition to the formation of the recessed surfaces 20a' 20b', it is a feature of the drill of FIG. 11 that inner cutting edges 16a', 16b' meet each other back to back. This means that there is no non-cutting zone. Actually, at the bottom of the notch the circumferential speed is zero so that no material is cut. However, the small portion of the work material remaining in the neighborhood of the bottom without being cut is thought to be destroyed by shearing force when the chips are carried out so that it is carried out therewith. Further, in the prior art, the drill chisel which does not substantially cut any material is at dead center so that excessive thrust load is exerted on the chisel and neighboring portions to cause pronounced wear thereof. With the drill according to the invention, the portion which does not cut material has a recessed shape so that load exerted on it is very low compared to the load exerted on the chisel in the prior art drill. The drill according to the invention is thus superior to the prior art drilling tool both in machining efficiency and life. Further, where the bottom of the notch is thin and lacks mechanical strength as in the case of FIG. 11, the mechanical strength of the bottom may be sufficiently increased by adjusting the degree of thinning, for instance to an extent to give the bottom a width m as shown in FIG. 9, or by merely setting the cutting edges 16a, 16b without thinning the bottom at all as in the case of FIG. 4. In other words, according to the invention, the mechanical strength of the bottom of the recessed portion of the drill can be adjusted by adjusting the size of the non-cutting zone. Increasing the non-cutting zone, however, increases thrust load and the load on the bottom of notch. Nevertheless, this load is far less than the high thrust load and corresponding wear in the case of the chisel in the prior art drill.

In the drill according to the invention, the width of the recessed portion, i.e., the size of the non-cutting zone, is determined depending on the material of the work, the diameter and depth of the bore to be formed, the machining conditions such as the peripheral speed or feed speed, the type of tool, etc. Generally, however, the length of the bottom 13 of the V-shaped notch 14 is desirably less than the greater two values: 3 mm and one-fifth of the outer diameter of the drill.

The dimension between the edges of the open top of the V-shaped notch is suitably no less than 0.2 mm and no greater than one half the drill diameter, more preferably no less than 0.5 mm and no greater than 10 mm. If the dimension is insufficient, the machining of the inner cutting edges 16a, 16b is difficult. If the dimension is excessive, grinding motion of the drill with the opposite edges 21a, 21b of the open top of V-shaped notch 14 alternately constituting the axis of rotation is likely. While the dimension noted varies with the shape and size of the rotary tool, the operating conditions thereof, the type and conditions of machine tool incorporating the rotary tool, the kind of the workpiece, the specifications of the drilling operation, etc., it is preferably set to a large value when it is desired to facilitate the machining of the inner cutting edges and bottom edge of the V-shaped notch while it is preferably set to a small value for avoiding grinding motion. Further, if the rigidity of the rotary tool and the machine tool is sufficiently high or if the diameter of the rotary tool is sufficiently large, it may be set to a value above the upper limit noted above, i.e., above 10 mm.

The angle between the opposed surfaces of the V-shaped notch is determined once the dimension between the opposite edges of the open top of the V-shaped notch and depth thereof are determined. That is, when the distance between the opposite edges of the open top of the V-shaped notch is determined, the depth thereof can be determined by selecting the angle noted above. Mathematically, the depth H (shown in FIG. 8) is expressed as $$H = L / \left( 2 \tan \frac{\theta}{2} \right) \quad (1)$$

where L is the distance between opposite edges of the open top of the V-shaped notch, and $\theta$ is the angle between the opposite surfaces of the V-shaped notch. If the angle $\theta$ is insufficiently small, the machining of the inner cutting edges and the bottom edges of the V-shaped notch is difficult. In addition, in this case the work in the neighborhood of the bottom of the V-shaped notch is plucked off. If the angle $\theta$ is excessive, the force urging the work gainst the bottom of the V-shaped notch, and hence the thrust load, is increased in case where the drill has a non-cutting zone.

A further advantage of the drill bit according to the invention is that the load on cutting edges in the low peripheral speed portions in the vicinity of the axis of rotation can be alleviated by adjusting the angle between the opposed surfaces of the V-shaped notch. That is, it is possible to cope with the low peripheral speed conditions sufficiently.

Figure 12:
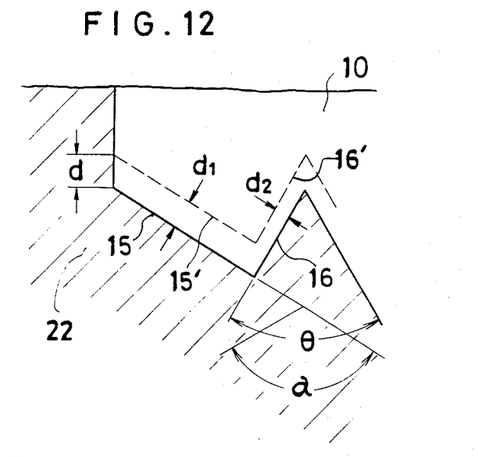
FIG. 12 is an explanatory view for the drilling operation with the drill according to the invention.

FIG. 12 schematically shows a drill 10 having inner cutting edges of a V-shaped notch according to the invention in drilling operation. Only one half of the drill is shown. The shaded portion 22 is the workpiece. Reference numeral 15 designates the outer cutting edge, and 16 the inner cutting edge of the V-shaped notch. Reference numeral 15' designates a portion of the bottom surface of the bore formed in the workpiece corresponding to the outer cutting edges, and 16' a portion of the bore bottom surface corresponding to the inner cutting edges. By d is denoted the depth of cut per cutting edge, by $d_1$ a cut normal to the outer cutting edge, and by $d_2$ a cut normal to the inner cutting edge. By $\alpha$ is denoted the point angle of the drill, and by $\theta$ the angle of the V-shaped notch.

The values $d_1$ and $d_2$ can be readily derived geometrically and expressed as $$d_1 = d \sin \frac{\alpha}{2} \quad (2)$$

$$d_2 = d \sin \frac{\theta}{2} \quad (3)$$

Where $\alpha$ is 118°, which is the usual point angle of the drill, $$d_1 = 0.857d.$$

Where $\theta$ is 60°, $$d_2 = 0.5d.$$

Obviously, the inner cutting edges 16 of the V-shaped notch of the drill according to the invention cut material with one half the amount d of cut and approximately 0.6 times the amount $d_1$ of cut in the direction normal to the outer cutting edges 15. Thus, they have very excellent performance.

Regarding the reduction of the cut of the inner cutting edges of the V-shaped notch, the effect increases with smaller angle $\theta$ and decreases with larger $\theta$ as is obvious from equation (3). The angle $\theta$, therefore, must be set by taking the problems in the machining of the drill and many other problems in the inner cutting edges of the V-shaped notch into consideration.

Figure 13:
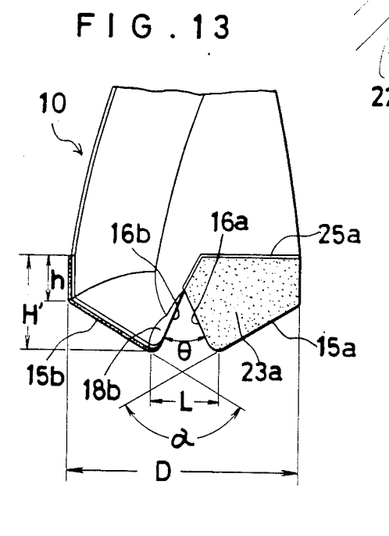
FIG. 13 is a side view showing the leading end portion of a further embodiment of a drill using boron nitride and/or diamond for the cutting edge portions according to the invention.
Figure 14:
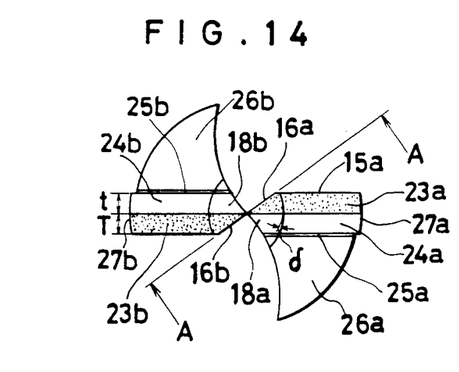
FIG. 14 is a plan view of the drill of FIG. 13.
Figure 15:
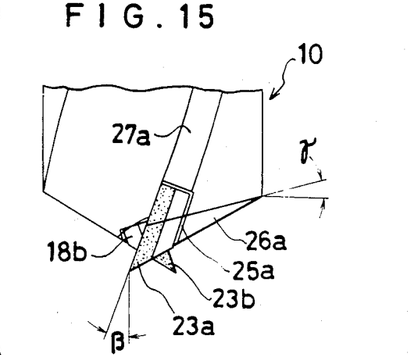
FIG. 15 is a view showing the drill of FIG. 14 in a direction at an angle of 90° with respect to FIG. 14.

FIGS. 13, 14 and 15 show a further embodiment of the drill 10 according to the invention, in which sintered members containing high density boron nitride and/or diamond are used for the cutting edge section. More specifically, sintered members 23a, 23b containing high density boron nitride and/or diamond are cemented on the drill body 10 via tungsten carbide members 24a, 24b, which are sinteredly bonded to the sintered members 23a, 23b at the time of sintering thereof, and silver solder layers 25a, 25b. Various parts of the drill of FIGS. 13 to 15 correspond to those of the general drill according to the invention except for that the sintered members 23a, 23b containing high density boron nitride and/or diamond (hereinafter referred to as sintered members) are provided in the cutting edge section. This structure is applicable to a solid drill or a drill with soldered tungsten carbide.

One contour feature of the drill shown in FIGS. 13 to 15 is that inner cutting edges 16a, 16b of the V-shaped notch terminate in outer cutting edges 15a, 15b via curved sections. Another contour feature is that the inner cutting edges 16a, 16b and relieved surfaces 18a, 18b have a positive relief angle. A further contour feature is that the drill is free from non-cutting zone while it also has no thinned portion. The provision of curved sections between the inner cutting edges 16a, 16b and the outer cutting edges has the effect of avoiding damage or wear due to stress concentration that would occur where the inner and outer cutting edges meet sharply. The provision of a positive relief angle for the relieved surfaces of the inner cutting edges of the V-shaped notch has the following effect. In the case of the drills shown in FIGS. 3 to 11, where the relieved surfaces of the inner cutting edges of the V-shaped notch have negative relief angles, the work material is urged against the relieved surfaces to generate thrust load and cause wear of or damage to the pertinent portion and neighboring portions. With the positive relief angle, contribution of the relieved surfaces of the inner cutting edges of the V-shaped notch to thrust load can be avoided to alleviate wear and reduce or eliminate damage. The freedom from thinning is effective to avoid otherwise possible local mechanical strength reduction due to stress concentration. The elimination of the non-cutting zone, however, means that the width of the bottom of the V-shaped notch is theoretically reduced to zero, so that the reduction of mechanical strength of this portion is inevitable. Accordingly, whether or not to provide a non-cutting zone and the size thereof, if any, are determined depending on the material of the work, the specifications and conditions of drilling operation, the material of the drill and other design factors thereof, etc.

In the above example of FIGS. 13 to 15, margins 27a, 27b consist of the sintered members 23a, 23b and tungsten carbide members 23a, 23b sinteredly bonded thereto at the time of sintering thereof. This is by no means limitative, and they may solely consist of a sintered member, or a tungsten carbide member may constitute only part of the rest of them.

Examples of the invention will now be given.

EXAMPLE 1

A drill as shown in FIGS. 13 to 15 was manufactured. The various portions of the drill had the following dimensions and angles.

Diameter D of body: 15 mm
Height H' of sintered member: 6 mm
Height h of margin of sintered member: 3 mm
Distance L between opposite edges of open top of V-shaped notch as taken in the direction of line A—A in FIG. 14: 4 mm
Angle $\theta$ of V-shaped notch as taken in the direction of line A—A in FIG. 14: 60°
Point angle $\alpha$: 118°
Rake angle $\beta$: 20°
Relief angle $\gamma$ of outer cutting edge: 15°
Relief angle $\delta$ of inner cutting edge: 1°
Thickness T of sintered member: 1 mm
Thickness t of simultaneously sintered tungsten carbide member: 1.5 mm.

The sintered members used had a Vickers hardness of 3,000 kg/mm² and contained wurtzite type boron nitride and they were soldered by silver solder to a tungsten carbide drill body with a length of 155 mm and a flute length of 55 mm.

SKD 11 (with a hardness of HRC 61) was used as the workpiece and 20 blind bores with depths ranging from 18 to 22 mm were formed in the workpiece by dry drilling at a rotational speed of 1,500 r.p.m. (corresponding to a peripheral speed of 70.7 m/min.) and a feed speed of 0.06 mm/rev.

After the drilling operation, no damage to the cutting edge section of drill was found. Only wear of the relieved surfaces of the outer cutting edges with a width of approximately 0.03 mm was recognized. A conical protuberance with a height of approximately 3 mm and a diameter of approximately 0.7 mm was left on the bottom of each bore formed.

COMPARATIVE EXAMPLE 1

Figure 16:
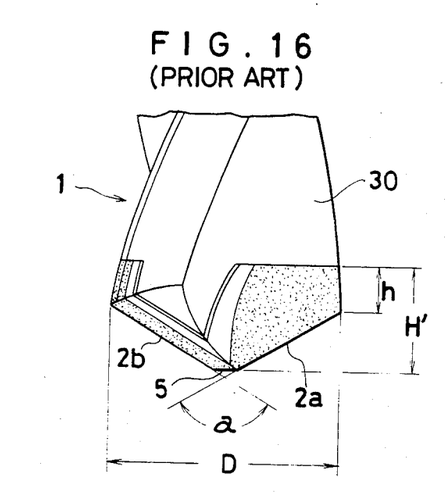
FIG. 16 is a side view showing the leading end portion of a prior art drill presented for purposes of comparison.
Figure 17:
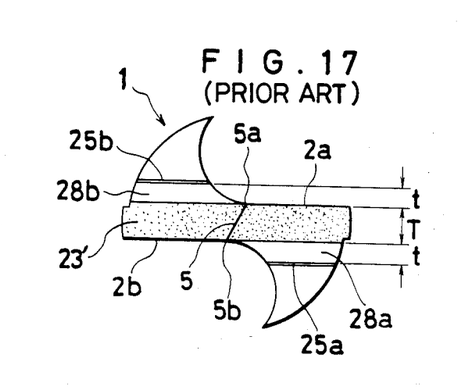
FIG. 17 is a plan view of the drill of FIG. 16.

A drill having the shape of an ordinary twist drill as shown in FIGS. 16 and 17 was manufactured using the same sintered members containing wurtzite type boron nitride as in Example 1. The body diameter D, point angle $\alpha$, rake angle $\beta$, relief angle $\gamma$, and length and groove length of the drill body were the same as in Example 1 except that no V-shaped notch was formed in the point. The sintered members each consisted of a lamination of a sintered member 23' with a thickness T of 2 mm and two tungsten carbide members 28a and 28b with a thickness t of 1 mm sinteredly bonded to the opposite sides of the sintered member 23' at the time of sintering thereof. They were inserted in a groove formed in a top portion of the drill body made of tungsten carbide and soldered thereto by silver solder 25a and 25b. The height H of the sintered member was set to 6.5 mm, and the height h of the margin of the sintered member was set to 3 mm.

The same drilling operation as in Example 1 was performed using this drill. When only a single bore was formed, large chippings were found on corners 5a, 5b of chisel 5, so that further drilling was not possible.

EXAMPLE 2

A drill having the contour as shown in FIGS. 8 and 9 was manufactured. Various portions of the drill had the following dimensions and angles.

Body diameter D: 9 mm
Distance L between opposed edges of open top of V-shaped notch: 3 mm
Angle $\theta$ of V-shaped notch: 90°
Point angle $\alpha$: 118°
Rake angle $\beta$: 25°
Relief angle $\gamma$ of outer cutting edge: 10°
Relief angle $\delta$ of top of inner cutting edge: 25°
Width m of bottom of V-shaped notch: 0.6 mm.

The drill body was made of SKH-9 steel, and its length was set to 124 mm and its flute length 8.9 mm.

SS41 steel with a Vickers hardness of 148 kg/mm² and a thickness of 13 mm was used as the workpiece, and drilling operation was performed on the workpiece using the drill at a rotational speed of 1,780 r.p.m. (corresponding to a peripheral speed of 50.3 m/min.) and a feed speed of 0.1 mm/rev. The peripheral speed noted corresponds to 2 to 2.5 times the recommended speed for a high speed steel drill (Mechanical Engineering Hand Book pp17-124 By The Japan Society of Mechanical Engineers, 1974). After formation of 20 through bores, no defectiveness of cutting edge was recognized.

COMPARATIVE EXAMPLE 2

The same drilling operation as in Example 2 was performed using an ordinary twist drill of the same material and same dimensions and angles as the drill in Example 2. When the second bore was drilled to a depth of 8 mm, increase of thrust load was observed. The operation was stopped and the cutting edges were inspected. The corners of the chisel were changed in color and deformed as though crushed. This is thought to be caused by excessive load on the chisel due to drilling operation at a peripheral speed in excess of the recommended speed.

As has been described in the foregoing, according to the invention with the provision of a V-shaped notch defining inner cutting edges in the vicinity of the axis of rotation of drill it is possible to reduce the thrust load so as to extremely reduce wear and damage. It is thus possible to extend the life of a drilling tool and obtain efficient drilling operation.

The aforementioned description refers to a drill bit having two outer cutting edges. In a drill bit having three or more outer cutting edges, the tool may be constructed such that V-shaped notches are formed in the tip portion of the drill so as to define the same number of inner cutting edges as that of the outer cutting edges and that the inner cutting edges terminate in the outer cutting edges respectively.

What is claimed is:

1. A drill bit:
   (a) which has an axis of rotation;
   (b) which, in use, advances into the material being drilled in a feed direction when rotated in a first angular direction around its axis of rotation;
   (c) the tip portion of which has at least two outer cutting edges;
   (d) the tip portion of which has at least two inner cutting edges defined by a V-shaped notch;
   (e) said V-shaped notch having a bottom edge that is a straight line that intersects the axis of rotation of said drill bit;
   (f) said bottom edge of said V-shaped notch defining a circular non-cutting zone in the material being drilled;
   (g) said V-shaped notch diverging from said bottom edge in the feed direction;
   (h) a first one of said at least two inner cutting edges terminating in a first one of said at least two outer cutting edges;
   (i) a second one of said at least two inner cutting edges terminating in a second one of said at least two outer cutting edges;
   (j) said inner and outer cutting edge being formed of sintered members containing a material selected from the group consisting of high density boron nitride, diamond, and both high density boron nitride and diamond;
   (k) said bottom edge of said V-shaped notch being disposed at an acute angle to a plane normal to the axis of rotation of said drill bit; and
   (l) said bottom edge of said V-shaped notch slanting away from the feed direction from a first point which, in use, first contacts the material being drilled to a second point,
   whereby the thrust load exerted in the drilling operation gives rise to a component tending to force the material in the non-cutting zone out of said V-shaped notch at said second point.

2. The drill bit according to claim 1 wherein:
   (a) the distance between the opposed edges of the open top of said V-shaped notch is no less than 0.2 mm and no greater than one-half the diameter of said drill bit;
   (b) the angle of said V-shaped notch is no less than 30° and no greater than 150°; and
   (c) the diameter of the non-cutting zone is less than the greater of one-fifth of the outer diameter of said drill bit and 3 mm.

3. The drill bit according to claim 2 wherein said at least two inner cutting edges defined by said V-shaped notch terminate in said at least two outer cutting edges on the outer side via curved sections, said curved sections being arcuate or approximately arcuate in shape.

4. The drill bit according to claim 1 wherein said at least two inner cutting edges defined by said V-shaped notch terminate in said at lesat two outer cutting edges on the outer side via curved sections, said curved sections being arcuate or approximately arcuate in shape.

5. The drill bit according to claim 1 wherein each one of said at least two outer cutting edges has a radius of curvature which progressively decreases from the circumference of said drill bit to the axis of rotation of said drill bit.

6. The drill bit according to claim 2 wherein each one of said at least two outer cutting edges has a radius of curvature which progressively decreases from the circumference of said drill bit to the axis of rotation of said drill bit.

7. The drill bit according to claim 3 wherein each one of said at least two outer cutting edges has a radius of curvature which progressively decreases from the circumference of said drill bit to the axis of rotation of said drill bit.

8. The drill bit according to claim 4 wherein each one of said at least two outer cutting edges has a radius of curvature which progressively decreases from the circumference of said drill bit to the axis of rotation of said drill bit.

9. The drill bit according to claim 1 wherein each one of said at least two outer cutting edges has a straight section nearer the circumference and an arcuate or approximately acruate section nearer the axis of rotation of said drill bit.

10. The drill bit according to claim 2 wherein each one of said at least two outer cutting edges has a straight section nearer the circumference and an arcuate or approximately acruate section nearer the axis of rotation of asid drill bit.

11. The drill bit according to claim 3 wherein each one of said at least two outer cutting edges has a straight section nearer the circumference and an arcuate or approximately arcuate section nearer the axis of rotation of said drill bit.

12. The drill bit according to claim 4 wherein each one of said at least two outer cutting edges has a straight section nearer the circumference and an arcuate or approximately arcuate section nearer the axis of rotation of asid drill bit.

13. The drill bit according to claim 1 wherein said inner and outer cutting edges are formed of sintered members containing high density boron nitride.

14. The drill bit according to claim 1 wherein said inner and outer cutting edges are formed of sintered members containing diamond.

15. The drill bit according to claim 1 wherein said inner and outer cutting edges are formed of sintered members containing high density boron nitride and diamond.

16. The drill bit according to claim 1 wherein each one of said at least two outer cutting edges is straight and extends outwardly to the outward periphery of said drill bit.

* * * * *

UNITED STATES PATENT AND TRADEMARK OFFICE
CERTIFICATE OF CORRECTION

PATENT NO. : 4,671,710

DATED : June 9, 1987

INVENTOR(S) : Masatada Araki

It is certified that error appears in the above-identified patent and that said Letters Patent is hereby corrected as shown below:

--The priority data was omitted from the Letters Patent.
It should read:

Oct. 29, 1982 [JP] Japan...........57-189091--

Signed and Sealed this

Thirteenth Day of October, 1987

*Attest:*

DONALD J. QUIGG

*Attesting Officer*   *Commissioner of Patents and Trademarks*